J. P. NIKONOW.
ELECTRIC WELDING APPARATUS.
APPLICATION FILED OCT. 5, 1917.
1,280,818.
Patented Oct. 8, 1918.
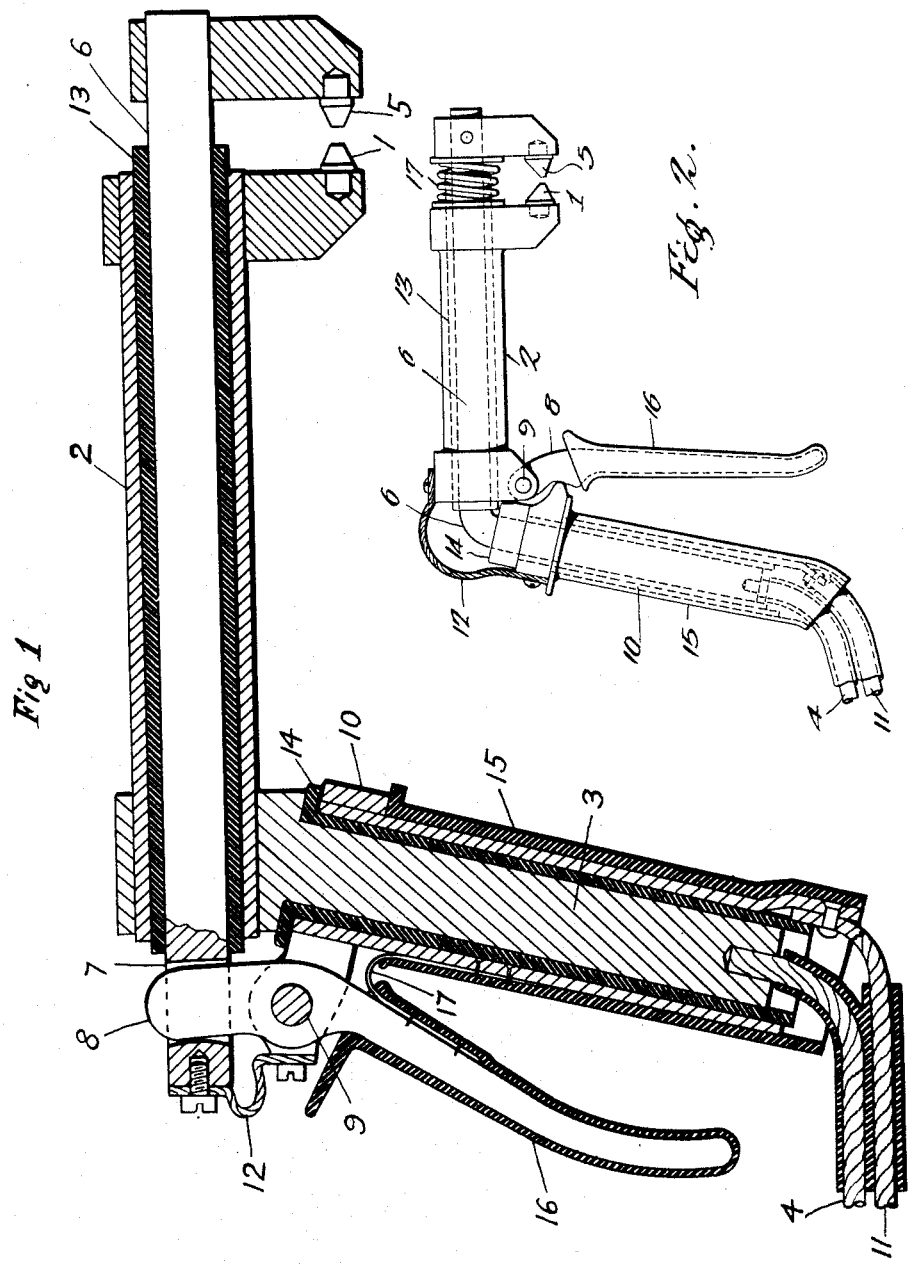
WITNESSES:
INVENTOR
John P. Nikonow

UNITED STATES PATENT OFFICE.

JOHN P. NIKONOW, OF BALTIMORE, MARYLAND.

ELECTRIC WELDING APPARATUS.

1,280,818.  Specification of Letters Patent.  Patented Oct. 8, 1918.

Application filed October 5, 1917. Serial No. 194,954.

*To all whom it may concern:*

Be it known that I, JOHN P. NIKONOW, a citizen of Russia and a resident of the city of Baltimore, in the State of Maryland, have invented a new and useful Improvement in Electric Welding Apparatus, of which the following is a specification.

My invention relates to the electric welding apparatus and it has particular reference to such mechanism as embody manually controlled portable electrodes.

The object of my invention is to provide a simple and convenient arrangement, whereby the electrodes of a portable apparatus can be manipulated with one hand, closing electric current in one spot on two or more metal sheets and exerting suitable pressure in this spot to produce the desired welding action.

In the construction of contact or spot welding apparatus difficulties have been encountered because of lack of convenient arrangement whereby an electric welding could be done on a stationary piece of work or one that is too large or too bulky to handle in the ordinary or stationary spot welding apparatus.

According to my invention, I employ an electric spot welding apparatus, comprising two electrodes, movably attached to the parts of a portable and manually operated frame, so that the apparatus can be held in one hand in a proper relation to the piece to be welded and at the same time, the electrodes can be brought together by the movement of the fingers and thereby the contact from electric current through the piece be closed and the necessary welding heat and pressure produced.

In the accompanying drawings, Figure 1 represents a longitudinal section through my apparatus, and Fig. 2, modification of same.

Electrode 1 is fastened to the metal frame 2 with a handle 3, to the end of which, a flexible lead is attached. Electrode 5 is attached to the sliding member 6, at the other end of which slot 7 is provided for actuating this member by means of a trigger or lever 8. The lever 8 moves on a fulcrum 9, attached to the frame 10, connected to a flexible lead 11. Flexible conductor 12 insures proper electrical connection between lead 11, frame 10, member 6, and electrode 5.

Insulation 13 separates movable member 6 from the frame 2. Insulation 14 separates frames 2 and 10, and insulation 15 on the handle and 16 on the lever protect the operator's hand from direct contact with the electric circuit.

Spring 17 tends to keep the electrodes apart, and the action of the hand (its grip on the handle and lever) brings the electrodes together with a considerable pressure, depending on the ratio of the lever arms.

A suitable transformer (not shown) may be introduced between the leads and ordinary electric circuit in order to obtain proper low voltage and high current capacity.

Fig. 2 represents a modification, in which the positions of the handle and the lever are transposed. The lever 8 is arranged to act as a trigger especially adapted to be operated by the fingers of the hand, holding handle 15. Spring 17 is located between the ends of the sliding members, and the outside tube 2 is made to slide over insulation 13 and frame 6. The fulcrum 9 is attached to the sliding tube, and the lever 8 bears on the projection on the handle with a corresponding depression, thus forming a pivoting point.

An important advantage of the mechanism above described is, that it can be easily manipulated, carried and controlled with one hand, so that the welding can be done on the pieces without disturbing their position or removing them from their place.

I claim as my invention:

1. In an electric welding apparatus, the combination with the portable frame, a removable electrode, supported by said frame, a sliding member in coöperation with said portable frame, a removable electrode, supported by said sliding member, a handle, integrally connected with said frame, means within said handle to conduct the electric current to both of said electrodes, and means to move said sliding member, said means being in a working relation with said handle.

2. In an electric welding apparatus, the combination with the portable frame, consisting of an insulated rod, supporting a removable electrode on one end and a handle on the other, a sliding member, supported by said insulated rod, a removable electrode, supported by said sliding member, means within said handle to conduct the electric current to both of said removable electrodes, and means to move said sliding member, said means consisting of a lever in a working relation with said handle.

3. In an electric welding apparatus, the combination with the portable frame, consisting of an insulated rod, a removable electrode on one end of said rod, a handle on the other end of said rod, a sliding member in coöperation with said insulated rod, a removable electrode, supported by said sliding member, means within said handle to conduct the electric current to both of said electrodes, and means to move said sliding member, said means consisting of a lever in a working relation with said handle.

In testimony whereof, I have hereunto subscribed my name this fourth day of October 1917.

JOHN P. NIKONOW.

Witnesses:
H. J. LINKERT,
MAX M. GRADSKY.